United States Patent
Lau et al.

(10) Patent No.: US 9,777,166 B2
(45) Date of Patent: Oct. 3, 2017

(54) PLASTICIZER FREE CAULKS AND SEALANTS COMPRISING WATERBORNE ACRYLIC POLYMERIC COMPOSITES AND METHODS FOR MAKING THE SAME

(71) Applicant: Rohm and Haas Company, Philadelphia, PA (US)

(72) Inventors: Willie Lau, Lower Gwynedd, PA (US); Karl Allen Bromm, Forest Grove, PA (US); Victoria A. Demarest, Flourtown, PA (US); Catheryn L. Jackson, Lansdale, PA (US); Audrey B. Liss, Newtown, PA (US)

(73) Assignee: Rohnm and Haas Company, Philadelphia, PA (US)

(*) Notice: Subject to any disclaimer, the term of this patent is extended or adjusted under 35 U.S.C. 154(b) by 0 days.

(21) Appl. No.: 14/653,172

(22) PCT Filed: Dec. 12, 2013

(86) PCT No.: PCT/US2013/074557
§ 371 (c)(1),
(2) Date: Jun. 17, 2015

(87) PCT Pub. No.: WO2014/099575
PCT Pub. Date: Jun. 26, 2014

(65) Prior Publication Data
US 2016/0194505 A1    Jul. 7, 2016

Related U.S. Application Data

(60) Provisional application No. 61/739,090, filed on Dec. 19, 2012.

(51) Int. Cl.
| | | |
|---|---|---|
| *C09D 5/34* | (2006.01) | |
| *C08F 2/00* | (2006.01) | |
| *C08F 220/18* | (2006.01) | |
| *C09D 133/12* | (2006.01) | |
| *C09K 3/10* | (2006.01) | |

(52) U.S. Cl.
CPC ......... *C09D 5/34* (2013.01); *C08F 2/001* (2013.01); *C08F 220/18* (2013.01); *C09D 133/12* (2013.01); *C09K 3/1006* (2013.01); *C09K 2200/0625* (2013.01)

(58) Field of Classification Search
CPC .... C08F 220/06; C08F 220/14; C08F 220/18; C08F 2220/1858; C08F 2220/1825; C08F 2220/1808; C08F 2/001; C08F 2500/21; C09D 5/34; C09D 133/12; C09K 2200/0625; C09K 3/10; C09K 3/1006
See application file for complete search history.

(56) References Cited

U.S. PATENT DOCUMENTS

| | | | | |
|---|---|---|---|---|
| 3,803,881 | A |   | 4/1974 | Getz et al. |
| 3,804,881 | A | * | 4/1974 | Bassett ............ C08F 2/00 526/80 |
| 5,118,531 | A | * | 6/1992 | Petersen ............ C08J 9/0061 427/230 |
| 5,756,573 | A |   | 5/1998 | Trumbo et al. |
| 6,027,763 | A | * | 2/2000 | Brown ............... C09D 5/004 427/136 |
| 6,060,532 | A | * | 5/2000 | Frankel ............ C08F 265/06 522/109 |
| 2009/0035587 | A1 | * | 2/2009 | Killilea ............ C08F 220/18 428/447 |
| 2011/0034621 | A1 | * | 2/2011 | Demarest ........... C09J 133/14 524/547 |

FOREIGN PATENT DOCUMENTS

| | | | | |
|---|---|---|---|---|
| EP | 0623659 | A2 * | 11/1994 | ....... C08F 265/06 |
| EP | 2281856 | A1 |  2/2011 | |
| GB | 1475546 | A * |  6/1977 | ....... C09D 5/34 |
| JP | 2000319301 | A | 11/2000 | |

OTHER PUBLICATIONS

Lambla, Morand, et al., "Effects of Reaction Pathway in Emulsion Copolymerisation on Film Mechanical Properties", Makromol. Chem. Suppl. 10/11, pp. 463-476 (1985).

* cited by examiner

*Primary Examiner* — Satya Sastri
(74) *Attorney, Agent, or Firm* — Andrew E. C. Merriam

(57) ABSTRACT

The present invention provides aqueous caulk or sealant compositions that are substantially free of any plasticizer comprising an aqueous emulsion copolymer having a broad measured glass transition temperature by differential scanning calorimetry (DSC), soft phases and hard phases, and two separate Tan Delta transition temperatures as measured by dimensional mechanical analysis (DMA), (ii) one or more filler in a filler to binder ratio of up to 4:1, and (iii) from 0.2 to 5 wt. % as solids, based on the total weight of the composition, of one or more thickener or rheology modifier. In addition, the invention provides methods of making the composition comprising polymerizing by gradually adding from a flask into a polymerization vessel a soft monomer composition, and, after feeding at least 20 wt. % of such composition in the vessel, gradually adding into the flask a hard comonomer composition, feeding all flask contents into the vessel and polymerizing.

9 Claims, No Drawings

PLASTICIZER FREE CAULKS AND SEALANTS COMPRISING WATERBORNE ACRYLIC POLYMERIC COMPOSITES AND METHODS FOR MAKING THE SAME

The present invention relates to filled aqueous caulks and sealants that are substantially free of any plasticizer and deliver excellent performance over a wide temperature range comprising copolymers having separate soft and hard phases, and to uses thereof as caulks and sealants and the methods of making them. More specifically, it relates to aqueous caulks and sealants which comprise acrylic powerfeed aqueous emulsion copolymers having a broad measured glass transition temperature (measured Tg) which are the copolymerization product of a monomer composition which when polymerized would provide a polymer having a calculated Tg of below −20° C. and second monomer composition which when polymerized would provide a polymer having a calculated Tg of from 20° C. to 140° C. as well as to methods of making the same.

Acrylic and other conventional emulsion polymers are known to provide weatherable caulks and sealants. However, such polymers that are soft for ease of application and low temperature flexibility to accommodate joint movement present an inability to provide adequate block resistance and durability in use, especially at above room temperature. Meanwhile, such polymers that are hard for durability and low tack reasons are generally difficult to use without including plasticizers. Plasticizers are undesirable because they are expensive and many of them may be unsafe to use. In addition, plasticizers remain permanently in the polymer phase contributing to undesirable tackiness and increased dirt pick up.

For aqueous caulk and sealant applications, several emulsion polymer binders that have a broad range of hardness as determined by glass transition temperature (Tg), are commercially available. Each of such conventional emulsion polymers has a single Tg and provides inferior performance properties as one gets further away from the Tg temperature of the emulsion polymer. Hence, properties that would characterize high Tg polymers, such as hardness, low tack and toughness are compromised in soft polymers. And properties that would characterize low Tg polymers, such as softness and low temperature film formation and flexibility are compromised in high Tg polymers.

Japan unexamined patent application no. 2000-319301A, to Showa Highpolymer Ltd., discloses power feed emulsion copolymers for use in coatings, wherein the emulsion copolymers comprise the polymerization product of an ethylenically unsaturated compound that gives a polymer Tg of −30° C. or lower and an ethylenically unsaturated compound that gives a polymer Tg of 30° C. or higher. The Japan published application mentions nothing of caulks and sealants and provides no way to make a caulk or sealant.

The present inventors have endeavored to solve the problem of providing a plasticizer free caulk or sealant comprising an acrylic emulsion copolymer binder which provides flexibility, low tack and tensile properties at a wide range of temperatures and use conditions.

STATEMENT OF THE INVENTION

1. In accordance with the present invention, aqueous caulk and sealant compositions that are substantially free of any plasticizer comprise (i) an aqueous emulsion copolymer having a broad measured glass transition temperature (broad measured Tg) by differential scanning calorimetry (DSC), a soft phase and hard phase domains and two separate Tan Delta transition temperatures as measured by dimensional mechanical analysis (DMA), which is the copolymer of a soft monomer composition which is a soft monomer or soft monomer mixture, which soft monomer composition would when polymerized provide a polymer having a calculated Tg of −20° C. or less, or, preferably, −30° C. or less, or, more preferably, −40° C. or less, and of a hard comonomer composition which is a hard comonomer or hard comonomer mixture, which hard comonomer composition would when polymerized provide a polymer having a calculated Tg of from 20° C. to 140° C., or, preferably, 25° C. or higher, or, preferably, 125° C. or less, (ii) one or more filler in a filler to binder ratio of from 0:1 to 4:1, for example, 0.25:1 or higher, or 3.5:1 or less, (iii) from 0.2 to 5 wt. % as solids, based on the total weight of the composition, preferably, 0.5 wt. % or more, or, preferably, 3 wt. % or less, of one or more thickener or rheology modifier and, (iv) water to adjust viscosity, wherein the caulk and sealant compositions have a solids content ranging from 50 to 80 wt. % and the compositions have a Brookfield viscosity (room temperature, 5 rpm, using the indicated spindle) of from 3,000 to 1,000,000 cPs, preferably, 10,000 cPs or more or, preferably, 500,000 cPs or less. The caulk and sealant compositions are substantially free of plasticizer, and, preferably, comprise 0.5 wt. % or less of plasticizer, based on the total weight of the composition.

2. Preferably, the emulsion copolymer in the compositions of item 1 is the copolymer of from 20 to 90 wt. %, preferably, from 50 to 80 wt. %, or, more preferably, from 65 to 80 wt. % of the soft monomer composition, based on the total weight of monomers used to make the emulsion copolymer.

3. Preferably, at least one of the soft monomer composition and hard comonomer composition is acrylic, or, more preferably, the emulsion copolymer comprises 80 wt. % or more, based on the total weight of monomers used to make the emulsion copolymer, of the product of copolymerizing acrylic monomer(s).

4. Preferably, at least one of the soft monomer composition or the hard comonomer composition in items 1 or 2 comprises, in copolymerized form, an ethylenically unsaturated acidic monomer, in the amount of from 0.1 to 5 wt. % based on the total weight of monomers used to make the emulsion copolymer, or, more preferably, a carboxylic acid, salt or anhydride group containing monomer, or, most preferably, acrylic or methacrylic acid.

5. Preferably, in the aqueous compositions of any of items 1 to 4, the thickener or rheology modifier is chosen from cellulosics, kaolin, polyacrylic acid salts, hydrophobic alkali swellable emulsion polymers, polyurethane thickeners, and mixtures thereof.

6. Preferably, the aqueous compositions of any of items 1 to 5 further comprise one or more organosilane, such as an epoxysilane.

7. In accordance with another aspect of the present invention, methods of making aqueous caulk and sealant compositions that are substantially free of any plasticizer and have a Brookfield viscosity (room temperature, 5 rpm) of from 3,000 to 1,000,000 cPs, preferably, 10,000 cPs or more or, preferably, 300,000 cPs or less and shear ($s^{-1}$) comprise a) gradually feeding from a soft monomer vessel into a polymerization vessel a soft monomer composition which is a soft monomer or soft monomer mixture, which composition would when polymerized provide a polymer having a calculated Tg of −30° C. or less, or, preferably, −40° C. or less, or, more preferably, −50° C. or less, and aqueous emulsion polymerizing the soft monomer composition in the polymerization vessel and, b) after feeding no less than 20 wt. % of the total soft monomer composition into the polymerization vessel, gradually feeding a hard comonomer composition which is a hard comonomer or hard comonomer mixture into the soft monomer vessel, which hard comonomer composition would when polymerized provide a polymer having a calculated Tg of from 20° C. to 140° C., or, preferably, 25° C. or higher, or, preferably, 125° C. or less, while continuing to gradually feed all monomers remaining in the soft monomer vessel into the polymerization vessel and polymerizing the soft and hard monomer compositions to form an aqueous emulsion copolymer having a soft phase and hard phase domains and two separate Tan Delta transition temperatures as measured by dynamic mechanical analysis (DMA), and c) combining with the aqueous emulsion copolymer from 0.2 to 5 wt. %, based on the total weight of the composition, preferably, from 0.4 to 3 wt. %, of one or more aqueous thickener or rheology modifier to form the composition.

8. In item 7, above, gradually feeding the hard comonomer composition into the soft monomer vessel after from 20 to 85 wt. %, or, preferably, 50 to 75 wt. % of the total soft monomer composition has been fed into the polymerization vessel.

9. In accordance with another aspect of the present invention, methods of using the aqueous caulk and sealant composition of any of items 1 to 6, above, comprise applying the composition to a substrate chosen from glass, mortar, aluminum, wood, vinyl, fiber cement, brick, concrete block, painted surfaces, combinations thereof, joints therein, seams therein, gaps therein, joints between substrate pieces and gaps between substrate pieces.

All ranges are inclusive and combinable. For example, a stated range of from 0.2 to 5 wt. %, based on the total weight of the composition, preferably, 0.4 wt. % or more, or, preferably, 3 wt. % or less of one or more thickener or rheology modifier refers to from 0.3 to 5 wt. %, from 0.3 to 3 wt. %, from 0.4 to 3 wt. %, and from 0.4 to 5 wt. %.

Unless otherwise indicated, any term containing parentheses refers, alternatively, to the whole term as if no parentheses were present and the term without them (i.e. excluding the content of the parentheses), and combinations of each alternative. Thus, the term "(meth)acrylic" refers to any of acrylic, methacrylic, and mixtures thereof.

Unless otherwise specified, all temperature units refer to room temperature (~20-24° C.) and all pressure units refer to standard pressure.

As used herein, the phrase "acrylic" refers to acrylic or methacrylic acid, salt, anhydride, ester, or amide monomers or the polymerization products thereof. When referring to emulsion copolymers, the term "acrylic" refers to polymers which comprise at least 50 wt. %, in copolymerized form, based on the weight of all monomers used to make the polymer, of acrylic monomers.

As used herein, the phrase "aqueous" includes water and mixtures comprising 50 wt. % or more of water in a mixture of water with water-miscible solvents that are volatile in use conditions.

As used herein, the term "Brookfield viscosity" refers to the room temperature composition viscosity as measured on a Brookfield RV DV-I viscometer with a Brookfield HELIPATH™ stand using a T-Bar type T-F spindle for compositions with viscosities above 1,000,000 cPs, a T-Bar type T-E spindle for compositions with viscosities of from 3,000 and 1,000,000 cPs. The speed of rotation of the spindle in all cases is 1 rpm and the spindle is run for 10 seconds before the measurement is made. The Brookfield Helipath™ stand allows the spindle to move down into the composition during rotation to ensure proper measurement of highly viscous materials.

As used herein, the term "calculated glass transition temperature" or "calculated Tg" refers to the calculated glass transition temperature of homopolymers or (co)polymers, as determined using the Fox equation (T. G. Fox, Bull. Am. Physics Soc., Volume 1, Issue No. 3, page 123 (1956)). For example, to calculate a Tg of a copolymer of monomers M1 and M2, $1/Tg=w(M1)/Tg(M1) +w(M2)/Tg(M2)$, wherein w(M1) is the weight fraction of monomer M1 in the copolymer, w(M2) is the weight fraction of monomer M2 in the copolymer, Tg(M1) is a published glass transition temperature ("Fox Tg") of a high molecular weight homopolymer (>50 k weight average MW) of M1, Tg(M2) is a published glass transition temperature of a high molecular weight homopolymer of M2, and all temperatures are in ° K. Suitable published glass transition temperatures are available at, for example, http://www.sigmaaldrich.com/img/assets/3900/Thermal_Transitions_of_Homopolymers. pdf. For example, the calculated Tg or glass transition temperature of a soft monomer alone is the glass transition temperature of a homopolymer of that soft monomer having a weight average MW of 50,000 or more; and the calculated Tg or glass transition temperature of a soft monomer mixture is the glass transition temperature of a copolymer of that soft monomer mixture having a weight average MW of 50,000 or more as given by the Fox equation.

As used herein the phrase "measured glass transition temperature" or "measured $T_g$" refers to the glass transition temperature of a material as determined by Differential Scanning calorimetry (DSC) scanning from −90° C. to 150° C. at a rate of 20° C/min on a DSCQ2000 manufactured by TA Instrument, New Castle, Del. The $T_g$ is the inflection point of the curve of heat flow vs. temperature or the maximum value on the plot of its derivative.

As used herein, the term "broad measured glass transition temperature (broad measured Tg)" refers to a DSC glass transition wherein either the onset or final temperature of the recorded temperature curve are poorly defined such that no meaningful single measured Tg can be taken, and instead only a range of measured Tgs can be recorded. An example of a polymer having a broad measured Tg is a powerfeed emulsion copolymer.

As used herein, the term "Dynamic mechanical analysis" or "DMA" refers to the method used to measure G' (loss modulus) and G" (storage modulus) over a predetermined range of temperature, typically set at −200° C. to 150° C., where G' is the energy dissipated as heat, representing the viscous portion of the polymer, and G" is the stored energy, representing the elastic portion of the polymer. In the present invention, DMA is measured with a dry polymer film tested in shear mode on the Rheometrics Mechanical Spectrometer (RMS-800) instrument using 8 mm diameter disposable parallel plate fixtures. Prior to measurement, the thickness of dry sample is measured to the nearest 0.001 mm and the data is input into the instrument to calculate the shear moduli. A temperature sweep was run from 150° C. to −50° C. at a cooling rate of 2° C/min using the Dynamic Temperature Ramp Mode. The applied frequency was 6.28 rad/s (1 Hz) and both AutoTension and AutoStrain options were employed during the test. The initial strain was 0.25%. The dynamic storage and loss moduli (G' and G" respectively) as well as tan δ were recorded as a function of temperature. The G' and G" as measured over the temperature range represent the polymer dynamic transition from a glassy state to the rubbery state and can be related to the Tg of the polymer. The Tan Delta, defined as the ratio of G'/G", provides one or more Tan Delta peak or transition temperatures over the predetermined range of temperature and is an alternative way to measure polymer Tg. In general, for a given polymer, a Tan Delta peak temperature will be ~10° C. higher than the corresponding Tg for the same polymer as measured by DSC.

As used herein, the phrase "filler to binder ratio" refers to the total weight of fillers and pigments (solids) to the total weight of aqueous binder solids (emulsion copolymer solids).

As used herein, the phrase "nonionic monomer" refers to any monomer such that the copolymerized monomer residue of which does not bear an ionic charge under conditions of use and over the pH range of pH 2-12.

As used herein, unless otherwise indicated, the phrase "polymer" includes homopolymers, and the phrase "copolymer" refers to any polymers made from two or more different monomers, including terpolymers, block copolymers, segmented copolymers, multi-staged copolymers, graft copolymers, and any mixture or combination thereof.

As used herein the phrase "substantially free of any plasticizer" refers to any composition which comprises 0.5 wt. % or less, based on the total weight of the composition.

As used herein, the phrase "weight average particle size" refers to the weight average particle size of a material as determined using capillary hydrodynamic fractionation (CHDF) with a Matec CH DF 2000 chromatography system (Matec Applied Sciences, Northborough, Mass.).

The present invention provides aqueous caulk and sealant compositions wherein the emulsion polymer binders have a broad measured Tg (by DSC) and both a soft phase and hard phase domains as indicated by the presence of two Tan Delta transitions for the emulsion polymer when measured by DMA. The aqueous compositions have the ability to deliver consistent performance at cold and warm temperatures. Made by a powerfeed emulsion polymerization process, the aqueous emulsion copolymer binders provide a compositional profile in use with a soft continuous phase and reinforcing hard microdomains that behaves like a composite. The emulsion copolymers retain this behavior without the use of plasticizers which can adversely impact the separation of the phases; thus, surprisingly, the present invention provides caulk or sealant compositions which give improved performance at a wide range of use temperatures precisely because they are substantially or completely plasticizer free. For the emulsion copolymer binders of the present invention, there are two Tan Delta transition temperatures or peaks measured by DMA and signifying the presence of two polymer phases having differing hardnesses as compared to a single peak for the random copolymers. Accordingly, the present invention provides caulk and sealant compositions having improved performance properties throughout a range of temperatures while maintaining the easy cleaning attributes of an acrylic composition.

The emulsion copolymer binders of the present invention have a phase formed from the polymerization of a soft monomer composition, which composition would when homopolymerized provide a polymer having a calculated Tg of −20° C. or less, or, preferably, −30° C. or less, or, more preferably, −40° C. or less. Suitable soft monomers may include, for example, butyl acrylate (BA), 2-ethylhexyl acrylate (2-EHA), ethyl acrylate (EA); alkyl vinyl ethers; and $C_8$ to $C_{30}$ alkyl (meth)acrylates, such as fatty (meth)acrylates like dodecyl methacrylate and octadecyl methacrylate. The soft monomer compositions may include harder monomers so long as the copolymer made from them has the calculated glass transition temperature of −20° C. or less as indicated in the statement of the invention, above.

The emulsion copolymer binders of the present invention have dispersed phases formed from the polymerization of a hard comonomer composition, which composition would, when homopolymerized, provide a polymer having a calculated Tg of from 20° C. to 140° C., or, preferably, 25° C. or higher, or, preferably, 125° C. or less. Suitable hard comonomers may include, for example, methyl methacrylate (MMA), isobutyl methacrylate, alicylic and aromatic (meth)acrylates, such as isobornyl methacrylate, cyclohexyl methacrylate; and arylene monomers, such as styrene and methyl styrene. Acidic monomers are also hard comonomers. The hard comonomer compositions may include softer monomers so long as the copolymer made from them has the calculated Tg of from 20 to 140° C.

The emulsion copolymers of the present invention may preferably include in their copolymerized form acidic monomers, such as mono-and di-carboxylic acid monomers. Suitable mono-and di-carboxylic acid monomers may include, for example, methacrylic acid (MAA), acrylic acid (AA), itaconic acid (IA), maleic acid (MA), and fumaric acid (FA), salts thereof and anhydrides thereof. Suitable sulfur acid containing monomers may include, for example, styrene sulfonate and acrylamidopropane sulfonate and their salts. Suitable phosphorus containing acids may include, for example, any phosphorus containing acids possessing at least one PON group in which the hydrogen atom is ionizable, and their salts, such as phosphoalkyl (meth)acrylates like 2-phosphoethyl methacrylate (PEM), di-, tri-, or polyphosphate ester group containing (meth)acrylates; alkylvinyl phosphonates and their salts; monomers containing groups formed from phosphinic acid, phosphonic acid, phosphoric acid, pyrophosphinic acid, pyrophosphoric acid, partial esters thereof, and salts thereof. Preferably, the acidic monomer is chosen from methacrylic acid, acrylic acid, and/or PEM.

Suitable binder copolymers are copolymerized from total amounts of one or more acidic monomer ranging up to 10.0 wt. %, based on total copolymerized monomer weight, or, preferably, 0.1 wt. % or higher, or 0.3 wt. % or higher, or 0.5 wt. % or higher, preferably, 5.0 wt. % or less, or, more preferably, 4.0 wt. % or less.

Preferably, to achieve transparency, the emulsion copolymers of the present invention have the ability to dry clear because of their small hard phases or microdomains, for example with an average particle size of 100 nm or less, preferably 50 nm or less (via light scattering), distributed in the continuous phase. Accordingly, the emulsion copolymers of the present invention can be formulated into clear caulks and sealants.

Preferably, the emulsion copolymers of the present invention are formed by a powerfeed process. In powerfeed polymerization, the soft monomer composition is gradually fed into a polymerization vessel over a total monomer feed time and, after a time period that begins with the start of the soft monomer composition feed and ends when the start of the hard monomer composition feed the hard comonomer composition is fed into the soft monomer composition while the soft monomer composition is fed into the polymerization vessel. In the methods of the present invention, the time period or delay from the beginning of the total monomer feed time (the time at which the soft monomer composition feed into the polymerization vessel is started) to the time at which the hard comonomer composition is fed into the soft monomer composition is expressed as a percentage of the total monomer feed time. It is this time period that enables the provision of separate hard and soft phases in the aqueous emulsion copolymer of the present invention.

More preferably, the total monomer feed time for the soft monomer composition and for the hard monomer composition ends simultaneously.

More preferably, the methods of making aqueous emulsion copolymers comprises starting the feed of the hard comonomer composition into the soft monomer composition (and from there into the polymerization vessel) after feeding from 20 to 85 wt. %, or, preferably, 50 to 75 wt. %, of the total soft monomer composition into the polymerization vessel.

Preferably, the feed rate of soft monomer composition is held constant.

Preferably, the feed rate of the hard comonomer composition is adjusted to end at same time as the soft monomer composition feed.

The aqueous binder copolymers of the present invention have solids contents of 30 wt. % or higher and up to 70 wt. %, based on the total weight of the aqueous copolymer, or, preferably, 45 wt. % or higher, or up to 70 wt. %.

The emulsion copolymers of the present invention may be made via semicontinuous conventional emulsion polymerization methods. In the polymerization, either thermal or redox initiation processes may be used. The reaction temperature may be maintained at a temperature lower than 100° C. throughout the course of the reaction, preferably from 30° C. to 95° C. Conventional feeding devices such as metering devices, feed vessels and reaction vessels may be used.

Polymerization reagents may include, for example, known catalysts including thermal initiators, like peracids or their salts, like persulfates, peroxides, or bis-nitriles; redox pairs, such as peroxides and (bi)sulfites. Initiators and redox catalysts may be used at levels of 0.01 to 3.0 wt. %, based on the total weight of monomers used to make the emulsion copolymer.

In polymerization, conventional emulsifiers and/or dispersants may be used, such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer.

In polymerization, conventional chain transfer agents such as mercaptans, like n-dodecyl mercaptan (nDDM) may be used. The chain transfer agents may optionally be added in conventional amounts, such as from 0.1 to 20 wt. %, preferably, less than 5 wt. %, based on the total weight of monomers and initiators. In addition, the chain transfer agents may be added in the powerfeed method into the soft monomer composition, which results in a molecular weight gradient in the polymer.

Preferably, to insure a stable aqueous emulsion copolymer having a low viscosity, the polymerization process comprises co-feeding a buffer such as $Na_2CO_3$ or $Na_2SO_4$ to the polymerization vessel during polymerization to maintain the polymerization medium at a pH of 5 or less, such as from 4-5. A buffer co-feed can continue throughout the duration of the soft monomer composition feed into the polymerization vessel, or during the feeding of from 50 to 100 wt. % of the soft monomer composition feed. More preferably, when the buffer is used, no neutralizing agent, e.g. ammonia, is used; this avoids undue thickening of the emulsion copolymer composition.

Preferably, during polymerization, the co-feeding of the buffer during polymerization takes place before the gradual feeding of the hard comonomer composition.

Following polymerization, initiators, optionally combined with reducing agents, may be used to minimize residual monomer content. In some cases the choice of initiator and accompanying chemicals, their level and method of addition, and the temperature can be chosen to affect a desired balance of the mechanical properties in the final binder. This process may be carried out in the same reaction or in a different vessel or kettle as was used for the polymerization.

Suitable aqueous binder copolymers may have weight average molecular weights ranging from 20,000 to 5,000,000 or more, preferably, 25,000 to 1,000,000. The upper limit of molecular weight is generally not limited and depends on the polymerization method used. For example, higher molecular weight aqueous emulsion copolymers will result from starting with seed polymers in the polymerization vessel. Optionally, a crosslinking agent can be used to increase the weight average molecular weight of the emulsion copolymers. Suitable crosslinking agents may include, for example, glycol di(meth)acrylates.

The aqueous compositions comprise one or more thickener or rheology modifier, such as a cellulosic thickener, such as, for example, hydroxyethyl cellulose ("HEC"); kaolin; hydrophobically-modified alkali swellable emulsions ("HASE") thickeners; polyacrylic acid salt thickeners ("ASE"); and polyurethane thickeners, such as hydrophobically-modified, ethoxylated urethane thickener ("HEUR").

Preferably, the one or more thickener or rheology modifier is chosen from HEC, HASE, ASE and HEUR. Examples of preferred thickeners include ACRYSOL™ TT-615 HASE thickener and ACRYSOL™ RM-12W HEUR thickener, both of which are available from the Dow Chemical Co, Midland, Mich.

In formulating the aqueous compositions, the pH of the composition can be adjusted depending on the kind of thickener used and acid content of the polymer. For the compositions that comprise of high acid containing binders (3-5 wt. % ethylenically unsaturated acidic monomers, based on total monomer weight) and/or alkali activated thickeners with HASE or ASE, the pH of the composition can be adjusted to 8 to 10 to achieve optimal thickening and the pH is kept below 5 until formulation. For the compositions that comprise of low acid containing binders (<2 wt. % ethylenically unsaturated acidic monomer) and/or non-ionic thickeners, such as HEC and HEUR or slightly basic fillers which thicken compositions, such as $CaCO_3$, thickening depends on the amount of thickener or basic filler.

The aqueous caulk or sealant compositions may be prepared from the aqueous emulsion copolymers by techniques which are well known in the sealants art. For example, the aqueous emulsion copolymer binder is added directly to a kettle, followed by the thickeners and additional ingredients and, lastly, by any filler and pigment. Mixing may be done in a high shear mixer with a sweep arm designed to pull the high viscosity sealant into the center of the mixer, or in a planetary mixer, with or without a high speed disperser blade. After all of the ingredients are added, the sealant is allowed to mix under a vacuum of 750 mm Hg or lower to remove entrapped air from the final product.

The aqueous caulks and sealants may have filler to binder (solids weight) ratios of from 0:1 (no filler) to 4:1 and may include nanoparticle extenders, such as colloidal silica, for clear compositions or, for filled or colored compositions, a solids weight ratio of from 0.04:1 to 4:1 of filler to binder. To improve glass adhesion and joint movement performance in the absence of plasticizer, caulks and sealants may have a filler to binder ratio of 2:0:1 or less, or preferably 0.2:1 or more. However, the present invention enables the provision of high performance clear caulks and sealants comprising conventional ingredients without plasticizers with desirable properties at a broad range of temperatures above and below the Tg of the composition as a random copolymer.

Suitable fillers may include, for example, alkaline earth metal sulfates or carbonates, such as, for example, barites, calcium carbonate, calcite and magnesium carbonate; silicates, such as, for example, calcium silicates, magnesium silicates, and talc; metal oxides and hydroxides, such as, for example, titanium dioxide, alumina and iron oxides; diatomaceous earth; colloidal silica; fumed silica; carbon black; white carbon black; nutshell flour; natural and synthetic fibres (especially plaster fibres); and scrap or recycled plastics in the form of dust, flakes or flour; hollow or solid ceramic, glass or polymeric microspheres.

An extender is any filler having an index of refraction of 1.4 or less. Examples of extenders include, for example, barites, calcium carbonate, and nanosized silica. Extenders are any having an average particle diameter below 50 nm, or, preferably, below 20 nm.

To enable improved adhesion, especially to glass, the caulks and sealants may comprise one or more organosilane adhesion promoter in amounts ranging from 0.001 to 5 wt. %, based on the total weight of the composition, preferably, 0.01 wt. % or more, or, preferably, up to 1.0 wt. %, or, more preferably, up to 0.5 wt. %. Suitable organosilanes may include, for example, any hydrolyzable or alkoxy functional organosilanes, such as, for example, trialkoxysilanes; aminoalkylsilanes or aminoalkoxysilanes, such as γ-aminopropyl triethoxysilane and N-(dimethoxymethylsilylisobutyl) ethylenediamine; epoxy functional alkoxysilanes, such as glycidyl propoxymethyl dimethoxysilane, y-glycidoxypropyl-methyl-diethoxysilane, γ-glycidoxypropyl trimethoxysilane, and γ-(3,4-epoxycycyclohexyl)ethyl trimethoxysilane; (meth)acryloyl alkoxysilanes, such as γ-methacryloxypropyl trimethoxysilane; vi nyltriethoxysilane, and γ-mercaptoalkoxysilanes.

To enable improved filler dispersion and uniformity in the composition, the aqueous caulks and sealants may comprise one or more dispersant which can be an organic dispersant, e.g. a carboxylic acid (co)polymer, such as poly(methacrylic acid), or inorganic dispersant, such as alkali(ne) metal salts of tripolyphosphates, metaphosphates and their salts, and hexametaphosphates and their salts. Suitable amounts of dispersants may range from 0.01 to 5 wt. %, based on the total weight of the aqueous composition, preferably, 0.02 to 2 wt. %, or, more preferably, 0.1 to 1.0 wt. %. Solvents may be added to improve tooling in use, increase open time (storage stability) and to better disperse additives, such as the silanes. Suitable solvents may include, for example, mineral spirits, turpentine, mineral oil, and (poly)alkylene glycols. Solvents are not plasticizers and are volatile in use conditions.

The compositions of the present invention may also include other additives conventionally employed in caulks and sealants, such as, for example, free-thaw stabilizers, drying oils, biocides, antifoamants, colorants, waxes and anti-oxidants.

Surfactants and emulsifiers commonly used in emulsion polymerization may be present as formulation additives. These include anionic, nonionic, and cationic surfactants, such as, for example, non-ionic surfactants, like alkylphenol ethoxylates (APEO) or APEO-free surfactants. In one embodiment, surfactants can be added to the latices during synthesis as post additives.

The aqueous caulk and sealant compositions may be applied as a caulk or a spray sealant. Thus, they may be used as kits comprising a caulk or sealant, such as in a squeeze tube, a cartridge or sausage pack adapted for use with a caulk gun, spray nozzle, a pressurized, gunless applicator, or in a pail or can, adapted for use with a bulk applicator such as a spray unit.

The compositions of the present invention are suitable for uses including applying the caulk and sealant to a substrate and allowing it to dry. Caulks and sealants can be applied to various substrates including wood, glass, metal, masonry, vinyl, brick, concrete block, fiber cement, gypsum, stone, tile and asphalt. Uses may include caulking and sealing windows, doors, fixtures, paneling, molding, finished walls and ceilings, and any gap, seam or joint therein or between substrate pieces, such as in tilt-up construction and chinking applications

EXAMPLES

The following examples illustrate, but do not limit, the present invention. Unless otherwise indicated, all procedures were performed at room temperature. In the examples, the following chemical abbreviations are used:

AA: Acrylic Acid; BA: Butyl Acrylate; EA: Ethyl Acrylate; EHA: 2-Ethylhexyl Acrylate; MAA: Methacrylic Acid; MMA: Methyl Methacrylate.

Examples 1, 3, 5, 7, 9, 11, 13, 15, 17 and 18

Synthesis of Emulsion Copolymer Composites By Powerfeed Emulsion Polymerization

Emulsion polymerization was carried out in a four neck 5 liter round bottom reaction flask equipped with a condenser, a mechanical stirrer, a thermocouple, a monomer feed line, an initiator feed line and a nitrogen inlet. 450 g of deionized water was added to the flask and its contents were heated to 90° C. under nitrogen sweep with stirring. To the reactor mixture at 90° C., a solution containing 2.9 g of sodium sulfate and 1.9 g of sodium carbonate dissolved in 30.8 g of water was added followed by 1.9 g of DISPONIL FES-993 (Cognis Corp, Ambler, Pa.), an anionic surfactant of fatty alcohol polyglycol ether sulfate in 14.9 g of water and 117 g of acrylic seed emulsion polymer 45 wt. % solids (particle size 40 nm) and a solution consisting of 7.0 g of ammonium persulfate in 33.8 g of water to form a reaction medium.

In a separate vessel from the reaction flask, as shown in Table 1, below, a monomer emulsion (ME) was prepared by mixing using a magnetic stirrer the indicated ingredients including surfactant 1 (surf 1), surfactant 2 (surf 2) and monomers. In another separate vessel, a solution consisting of 2.3 g of ammonium persulfate (APS) in 110 g of water and a buffer solution consisting of 2.0 g of sodium sulfate (NaS) and 1.0 g of sodium carbonate ($Na_2CO_3$) in 110 g of water were prepared.

With the reaction medium in the reaction flask temperature at 82 to 86° C., the ME was fed into the reaction over a total monomer feed time of 120 minutes together with a cofeed of the APS and buffer solution. The temperature of the reaction mixture was held at 85° C. during the polymerization. After feeding ME until the indicated portion of the total ME feed (Soft feed in Table 1, below) has been fed into the reaction flask, the hard comonomer feed into the monomer emulsion vessel. The ME feed ended at the same time. At the end of the feed, the temperature of the reaction mixture was held at 85° C. for 10 minutes follow by cooling.

The product emulsion copolymers had solids contents ranging from 40 to wt. % to 65 wt. %.

The final compositions of each emulsion copolymer are presented in Table 3, below.

TABLE 1

Aqueous Emulsion Copolymer Compositions

| Example | Water (g) | Surf 1[1] (g) | Surf 2[2] (g) | Monomer Emulsion (ME) (g) | | | | | Soft feed (wt. %) | Hard Co-monomer MMA |
|---|---|---|---|---|---|---|---|---|---|---|
| | | | | BA | EHA | EA | MMA | AA | | |
| 1  | 284 | 20.7 | 9.5 | 1425  | 0      | 0     | 0   | 75 | 50 | 375 |
| 3  | 284 | 20.7 | 9.5 | 0     | 1425   | 0     | 0   | 75 | 50 | 375 |
| 5  | 284 | 20.7 | 9.5 | 0     | 1237.5 | 0     | 0   | 75 | 50 | 562.5 |
| 7  | 284 | 20.7 | 9.5 | 0     | 1012.5 | 412.5 | 0   | 75 | 50 | 375 |
| 9  | 284 | 20.7 | 9.5 | 0     | 712.5  | 712.5 | 0   | 75 | 50 | 375 |
| 11 | 284 | 20.7 | 9.5 | 0     | 806    | 806   | 0   | 75 | 50 | 187.5 |
| 13 | 284 | 20.7 | 9.5 | 712.5 | 712.5  | 0     | 0   | 75 | 50 | 375 |
| 15 | 284 | 20.7 | 9.5 | 0     | 1140   | 0     | 285 | 75 | 50 | 375 |
| 17 | 284 | 20.7 | 9.5 | 0     | 1012.5 | 412.5 | 0   | 75 | 0  | 375 |
| 18 | 284 | 20.7 | 9.5 | 0     | 1012.5 | 412.5 | 0   | 75 | 75 | 375 |

[1] Surfactant 1: DISPONIL FES-993 (Cognis), anionic fatty alcohol polyglycol ether sulfate;
[2] Surfactant 2: TERGITOL 15-S-9 (The Dow Chemical Company), nonionic secondary alkyl ethoxylate;
3. Percent of the total soft monomer composition fed into the polymerization vessel before the start of the feed of hard monomer being fed into the ME. The feed rate of the soft monomer composition was held constant, with the feed rate of the hard comonomer composition adjusted to end at same time as the soft monomer composition feed. The total feed time of the monomer emulsion with the powerfeed stage was 120-140 minutes.

Comparative Examples 2, 4, 6, 8, 10, 12, 14 and 16

Synthesis of Comparative Emulsion Copolymers

Emulsion polymerization was carried out in a four neck 5 liter round bottom reaction flask was equipped with a condenser, a mechanical stirrer, a thermocouple, a monomer feed line, an initiator feed line and a nitrogen inlet. 450 g of deionized water was added to the flask and the content was heated to 90° C. under nitrogen gas sweep with stirring. To the reactor mixture at 90° C., a solution containing 2.9 g of sodium sulfate and 1.9 g of sodium carbonate dissolved in 30.8 g of water was added followed by 1.9 g of DISPONIL FES-993 (Cognis), an anionic surfactant of fatty alcohol polyglycol ether sulfate in 14.9 g of water and 117 g of seed emulsion polymer (acrylic emulsion polymer with 45 wt. % solids and particle size 40 nm and a solution consisting of 7.0 g of ammonium persulfate in 33.8 g of water to form a reaction mixture.

In a separate vessel from the reaction flask, a monomer emulsion (ME) was prepared by mixing the ingredients using a magnetic stirrer as indicated in Table 2, below, including surfactant 1 (surf1), surfactant 2 (surf2) and monomers. In separate vessel, a solution consisting of 2.3 g of ammonium persulfate (APS) in 110 g of water and a buffer solution consisting of 2.0 g of sodium sulfate (NaS) and 1.0 g of sodium carbonate ($Na_2CO_3$) in 110 g of water was prepared.

With the reaction mixture in the reaction flask temperature at 82 to 86° C., ME was fed into the reaction over a total feed time of 120 minutes together with the cofeed of the APS solution and buffer solution. The temperature of the reaction mixture was held at 85° C. during the polymerization. At the end of the feed, the temperature of the reaction mixture was held at 85° C. for 10 minutes follow by cooling.

The product emulsion copolymers had solids contents ranging from 40 wt. % to 65 wt. %.

The final compositions of each emulsion copolymer are presented in Table 3, below.

TABLE 2

Comparative Aqueous Gradual Addition Copolymer Compositions

| Comparative Example | Water | Surf 1[1] | Surf 2[2] | Monomer Emulsion (ME) | | | | |
|---|---|---|---|---|---|---|---|---|
| | | | | BA | EHA | EA | MMA | AA |
| 2  | 284 | 20.7 | 9.5 | 1425  | 0      | 0     | 375   | 75 |
| 4  | 284 | 20.7 | 9.5 | 0     | 1425   | 0     | 375   | 75 |
| 6  | 284 | 20.7 | 9.5 | 0     | 1237.6 | 0     | 562.5 | 75 |
| 8  | 284 | 20.7 | 9.5 | 0     | 1012.6 | 412.5 | 375   | 75 |
| 10 | 284 | 20.7 | 9.5 | 0     | 712.5  | 712.5 | 375   | 75 |
| 12 | 284 | 20.7 | 9.5 | 0     | 806.3  | 806.3 | 187.5 | 75 |
| 14 | 284 | 20.7 | 9.5 | 712.5 | 712.5  | 0     | 375   | 75 |
| 16 | 284 | 20.7 | 9.5 | 0     | 1140   | 0     | 660   | 75 |

[1] Surfactant 1: DISPONIL FES-993 (Cognis), anionic fatty alcohol polyglycol ether sulfate
[2] Surfactant 2: TERGITOL 15-S-9 (The Dow Chemical Company), nonionic secondary alkyl ethoxylate.

The emulsion copolymers of Examples 17 and 18 were made in the same manner as the emulsion copolymer of Example 7, except that for Example 17 the soft monomer ME feed is begun simultaneously with the feed of the hard monomer into the soft monomer vessel (time period equals 0 or 0%). Therefore, no distinct soft polymer phase is generated. The difference between Example 17 and Example 8 is that the polymer of Example 17 has a gradient composition and Example 8 has a random and narrow distributed composition. Example 18 has a time period of 75% of the total monomer feed time before the hard monomer feed into the soft monomer vessel is begun, which resulted in a higher proportion of the soft composition. Example 7, 17, 18 and 8 all have exactly the same overall monomer composition. The changes in the synthetic method resulted in distinct polymeric products.

The emulsion copolymers of Examples 1, 3, 5, 7, 9, 11, 13, 15, 17 and 18 and some or all of the emulsion copolymers of comparative Examples, 2, 4, 6, 8, 10, 12, 14, 16 and 19-22 were tested using the following test methods:

Low Temperature Flex (LTF): Emulsion copolymers as synthesized were drawn down on 10 cm×23 cm aluminum panels with a 1 mm draw down bar. The drawn emulsion copolymer layers were allowed to dry for 4 days at room temperature and were then put in a vacuum oven for 12 hrs at 60° C. Aluminum panels were cut into 7.6 cm length and 2.56 cm width strips. The strips were then placed into a cold box at 244° K. for 2 hours followed by bending over a 1.27 cm dowel. The sample failed flexibility at the temperature if the sample cracked on bending.

If this test was performed at a different temperature, then each time the temperature was varied the emulsion copolymers were drawn down and allowed to sit at that temperature for 2 hours before testing.

Tack Evaluation: Emulsion copolymers as synthesized were drawn down on 10 cm×23 cm aluminum panels with a 1 mm draw down bar. The samples were allowed to dry for 4 days at room temperature. The samples were then put in a vacuum oven for 12 hrs at 60° C. The samples were then evaluated with the touch of a finger and were rated using the following scale: 5 =Very Very Tacky; 4 =Very Tacky; 3=Moderately Tacky; 2=Slightly Tacky; 1=No Tack.

Tensile/Elongation: Emulsion copolymer samples (8 g polymer solids after drying) as synthesized were poured into 10 cm diameter petri dishes and let dry at room temperature for 14 days. At 7 days the samples were flipped over to promote drying. Samples were then cut into 1.27 cm wide by 7.6 cm long strips and a thickness range between 0.9 mm to 2.0 mm. The dried emulsion copolymer strips were tested using a Tinius Olsen, Inc. (Horsham, Pa.) device with a gauge length of 2.54 cm and pulled apart at a rate of 2.54 cm/min. until they broke. The length of the strip at break was recorded as % Elongation with respect to the original length. The tensile strength at break was recorded as $T_{Break}$ and the maximum tensile strength reached before the break was recorded as $T_{max}$ The Tmax, Tbreak and % Elongation of each strip were then recorded. The result given below is the average of 3 strips tested.

Dynamic Mechanical Analysis: A 16 g sample of the indicated wet emulsion copolymers were poured into TEFLON™ polymer Petri dishes and allowed to air dry for 48 hr. Each of the dried samples was inverted and allowed to further dry for 24 hours. Each of the Petri dishes was then dried for eight hours at 40° C. and placed in a vacuum oven until use. The resulting dried emulsion copolymer samples were then tested under shear on a Rheometrics Mechanical Spectrometer (RMS-800) (TA Instruments, New Castle, Del.) using 8 mm diameter disposable parallel plate fixtures.

Prior to measurement, the thickness of each dry sample was measured to the nearest 0.001 mm and the data were input into the instrument to calculate the shear moduli. A temperature sweep was run from 150° C. to −50° C. at a cooling rate of 2° C/min using the Dynamic Temperature Ramp Mode of the spectrometer. The applied frequency was 6.28 rad/s (1 Hz) and both AutoTension and AutoStrain options were employed during the test. The initial strain was 0.25%. For each dry sample, the dynamic storage and loss moduli (G' and G", respectively) as well as tan δ of the dry samples were recorded as a function of temperature.

TABLE 3

Emulsion Copolymer Compositions

| Example | Emulsion Copolymer | Polymerization Method[1] |
|---|---|---|
| 1 | 76 BA/20 MMA/4 AA | PF |
| *2 | " | R |
| 3 | 76 EHA/20 MMA/4 AA | PF |
| *4 | " | R |
| 5 | 66 EHA/30 MMA/4 AA | PF |
| *6 | " | R |
| 7 | 54EHA/22EA20MMA/4AA | PF |
| *8 | " | R |
| 9 | 38EHA/38EA/20MMA/4AA | PF |
| *10 | " | R |
| 11 | 43EHA/43EA/10MMA/4 AA | PF |
| *12 | " | R |
| 13 | 38EHA/38BA/20MMA/4 AA | PF |
| *14 | " | R |
| 15 | 60.8 EHA/35.2MMA/4 AA | PF |
| *16 | " | R |
| *17 ] | 54EHA/22EA/20MMA/4AA (0% Time period) | PF |
| 18 ] | 54EHA/22EA/20MMA/4 AA (75% Time Period) | PF |
| *19 | BA/MMA/MAA Random Copolymer with Tan Delta peak at 2° C. | R |
| *20 | BA/MMA/MAA Random Copolymer with Tan Delta peak at −8° C. | R |
| *21 | EHA/BA/MMA/MAA Random Copolymer with Tan Delta peak at −27° C. | R |
| *22 | BA/MMA/MAA Random Copolymer with Tan Delta peak at 8° C. | R |

[1]PF: Powerfeed method; R: Random Copolymer.
*comparative example

The results of the testing of emulsion copolymer films is presented in Tables 4 and 4B, below. The results of the testing of clear caulk films made from the emulsion copolymers is presented in Table 5, below. The results of the testing of filled caulks made from the emulsion copolymers is presented in Table 6, below.

TABLE 4

Clear Film Properties

| Example | Modulus (G') (dyne/cm² E-6) | | | | Tan δ (° C.) | LTF (° C.) | Tack [1] | Tensile Properties | | |
|---|---|---|---|---|---|---|---|---|---|---|
| | 0 | 10 | 20 | 40 | | | | $T_{max}$ MPa | $T_{Break}$ MPa | Elong (%) |
| 1 | 470 | 280 | 100 | 3 | −30, 35 | −45 | S-2 | 0.13 | 0.11 | 710 |
| *2 | 150 | 4.5 | 2.8 | 1.4 | −6 | −25 | V-4 | 0.20 | 0.11 | 1987 |
| 3 | 200 | 55 | 10 | 1.4 | −58, 23 | −49 | S-2 | 0.24 | 0.21 | 645 |
| *4 | 3.2 | 1.2 | 1.2 | 0.66 | −19 | −40 | V-4 | 0.20 | 0.14 | 1202 |
| 5 | 1200 | 790 | 530 | 120 | −62, 54 | −35 | N-1 | 0.54 | 0.41 | 487 |
| *6 | 24 | 6.2 | 3 | 1.4 | −3 | >−25 | V-4 | 0.32 | 0.12 | 1818 |
| 7 | 500 | 260 | 55 | 2.2 | −35, 30 | −35 | S-2 | 0.18 | 0.13 | 757 |
| *8 | 1.6 | 5.1 | 2.8 | 1.5 | −6 | −25 | V-4 | 0.26 | 0.15 | 1628 |
| 9 | 620 | 280 | 37 | 2.1 | −23, 26 | −25 | S-2 | 0.12 | 0.08 | 1541 |
| *10 | 48 | 7.6 | 3 | 1.1 | 1 | >−25 | T-3 | 0.23 | 0.12 | 2250 |
| 11 | 10 | 3.5 | 1.8 | 0.7 | −0.6 | NA | NA | 0.13 | 0.10 | 2710 |
| *12 | 8 | 3 | 2 | 0.9 | −10.5 | NA | NA | 0.15 | 0.09 | 1694 |
| 13 | 310 | 66 | 8 | 1.4 | −40, 20 | −45 | T-3 | 0.16 | 0.13 | 1184 |
| *14 | 7 | 3 | 1.8 | 1 | −11 | −25 | V-4 | 0.18 | 0.12 | 1544 |
| 15 | 400 | 220 | 110 | 15 | −20, 43 | −30 | N-1 | 0.42 | 0.29 | 965 |
| *16 | 300 | 20 | 9 | 2.8 | 7 | >−25 | S-2 | 0.49 | 0.21 | 2380 |
| *17 | 34 | 7.3 | 3.1 | 1.3 | 2.3 | | | 0.22 | 0.15 | 2130 |
| 18 | 180 | 140 | 93 | 48 | −28, 38 | | | 0.23 | 0.16 | 575 |
| *19 | 90 | 11 | 4.4 | 2.1 | 2 | 2 | S-2 | 0.14 | 0.14 | 2160 |
| *20 | 9 | 3.2 | 1.8 | 0.7 | −8 | −8 | V-4 | 0.12 | 0.10 | 2870 |
| *21 | 1.8 | 1 | 0.8 | 0.5 | −27 | −27 | VV-5 | 0.09 | 0.07 | 1710 |

[1] N = no tack (1); S = Slight (2); T or Mod = Tacky (3); Mod to Sev or V = Very tacky (4); Severe = VV = Very Very Tacky (5);
*comparative example

TABLE 4B

Clear Film Properties.

| Example | Modulus (G') (dyne/cm² E-6) | | | | | | |
|---|---|---|---|---|---|---|---|
| | −30 | −20 | −10 | 0 | 10 | 20 | 40 |
| 1 | 1973 | 1033 | 700 | 470 | 280 | 100 | 3 |
| *2 | 4414 | 2623 | 180 | 150 | 4.5 | 2.8 | 1.4 |
| 3 | 965 | 634 | 400 | 200 | 55 | 10 | 1.4 |
| *4 | 528 | 46 | 8.4 | 3.2 | 1.2 | 1.2 | 0.66 |
| 5 | 1494 | 1317 | 1116 | 1200 | 790 | 530 | 120 |
| *6 | 3930 | 1940 | 275 | 24 | 6.2 | 3 | 1.4 |
| 7 | 1685 | 1112 | 778 | 500 | 260 | 55 | 2.2 |
| *8 | 4099 | 1646 | 122 | 1.6 | 5.1 | 2.8 | 1.5 |
| 9 | 2380 | 1457 | 982 | 620 | 280 | 37 | 2.1 |
| *10 | 3077 | 2530 | 919 | 48 | 7.6 | 3 | 1.1 |
| 11 | 1996 | 527 | 96 | 10 | 3.5 | 1.8 | 0.7 |
| *12 | 3678 | 797 | 38 | 8 | 3 | 2 | 0.9 |
| 13 | 1318 | 944 | 632 | 310 | 66 | 8 | 1.4 |
| *14 | 2681 | 458 | 28 | 7 | 3 | 1.8 | 1 |
| 15 | 2538 | 1222 | 658 | 400 | 220 | 110 | 15 |
| *16 | 4867 | 3937 | 2003 | 300 | 20 | 9 | 2.8 |
| *17 | 1983 | 1120 | 268 | 34 | 7.3 | 3.1 | 1.3 |
| 18 | 6267 | 253 | 169 | 180 | 140 | 93 | 48 |
| *19 | 4688 | 4302 | 2657 | 90 | 11 | 4.4 | 2.1 |
| *20 | 4162 | 2125 | 81 | 9 | 3.2 | 1.8 | 0.7 |
| *21 | 109 | 9.4 | 3.2 | 1.8 | 1 | 0.8 | 0.5 |

N = no tack (1); S = Slight (2); T or Mod = Tacky (3); Mod to Sev or V = Very tacky (4); Severe = VV = Very Very Tacky (5);
*Comparative example.

As shown in Table 4, above, the inventive emulsion copolymers all exhibited much improved tack and low temperature flexibility as well as modulus at all temperatures tested when compared to the same emulsion copolymer made by random copolymerization. For the inventive emulsion copolymers, the modulus value below the Tg of the random copolymer is lower than that of the inventive polymer and the modulus value above the Tg of the random copolymer is higher than that of the inventive polymer. This indicates superior polymer properties at temperatures on both side of the Tg with respect to the random copolymer. As shown in Table 4B, above, comparing the emulsion copolymer and their corresponding random copolymer comparatives having identical overall monomer compositions, respectively, in Examples 1 and 2; 3 and 4; 5 and 6; 7 and 8; 9 and 10; 11 and 12; 13 and 14; 15 and 16, the dynamic mechanical analysis (DMA) demonstrates that the modulus transition behavior of a soft copolymer can be made to mimic that of a high Tg polymer without losing the soft polymer properties in the compositions. The soft properties of the polymeric composites (flexibility and softness) are exemplified by the lowered modulus at temperatures below the glass transition temperature. As shown in Table 4, above, in Examples and corresponding comparatives, respectively, Examples 1 and 2; 3 and 4; 5 and 6; 7 and 8; 9 and 10; 11 and 12; 13 and 14; 15 and 16, the two Tan Delta transitions in the inventive emulsion copolymers demonstrates the presence of a much harder polymer phase in the emulsion copolymer binder of the present invention when compared to random copolymers made from the same monomer mixture which lack a second transition or one at such a high temperature.

The clear caulks in Table 5, below were formulated from the emulsion copolymers of the indicated Example by mixing 100 g of the emulsion polymer with 3.7 g of aqueous ammonia (28 wt. % solution) by a SpeedMixer™ DAC 400 FVZ (FlackTek, Inc., Landrum. S.C.) at 2000 rpm for 1 minute followed by the addition of 0.8 g of Acrysol™ TT-615 thickener (The Dow Chemical Company) with an additional 1 minute of mixing at 2000 rpm. The viscosities of the caulks ranged from 100,000 to 350,000 cPs.

TABLE 5

Clear Caulk Evaluation

| Example | LTF (° C.) | Tack[1] |
|---|---|---|
| 1 | −30 | Slight-2 |
| *2 | 0 | 4 |

TABLE 5-continued

Clear Caulk Evaluation

| Example | LTF (° C.) | Tack[1] |
|---|---|---|
| 3 | −20 | Mod-3 |
| *4 | −20 | Sever-5 |
| 5 | −20 | None-1 |
| *6 | >0 | Mod-3 |
| 7 | 0 | Slight-2 |
| *8 | 0 | Mod-Sev - 4 |
| *17 | >0 | Mod-3 |
| 18 | −10 | Slight-2 |
| *19 | >0 | Slight-2 |
| *20 | −20 | Mod-3 |
| *21 | <−40 | Sever-5 |
| *22 | >0 | None-1 |

[1]N = no tack (1); S = Slight (2); T or Mod = Tacky (3); Mod to Sev or V = Very tacky (4); Severe = VV = Very Very Tacky (5);
*comparative example As shown in Table 5, above, the clear caulk formulations of the inventive emulsion copolymers all have improved tack and low temperature flexibility when compared to the same caulk formulation have the same emulsion copolymer made by random copolymerization.

The filled caulks in Table 6, below were formulated from the emulsion copolymers of the indicated Example by mixing 83 g of the indicated emulsion copolymer with 13.5 g of Drikalite ($CaCO_3$), 0.5 g of Ti Pure R-900 (DuPont, Wilmington, Del.) by SpeedMixer™ DAC 400 FVZ (Flack-Tek) at 200 rpm for 1 minute, following by the addition of 0.7-1.4 g of aqueous ammonia (28%) to a pH of 7.5 to 7.7 and mixing for 1 minute. The mixture was thickener by slow addition of 0.2 to 1.0 g of Acrysol TT-615 (a hydrophobically-modified alkali swellable emulsion polymer from The Dow Chemical Company) with continous mixing with a bench top mechanical mixer. The viscosities of the caulks ranged from 100,000 to 500,000 cPs.

TABLE 6

Evaluation Of Filled Caulks

| Example | LTF (° C.) | Tack[1] |
|---|---|---|
| 1 | −20 | None-very slight 1-2 |
| *2 | −10 | Mod-3 |
| 5 | +20 | None-1 |
| *6 | +10 | Slight-2 |
| 7 | 0 | Slight-2 |
| *8 | +10 | Mod-3 |
| *17 | +10 | Mod-3 |
| 18 | −10 | None-very slight 1-2 |
| *19 | +10 | |
| *20 | −10 | |
| *21 | −40 | Severe-5 |
| *22 | >+20 | None-1 |

[1]N = no tack (1); S = Slight (2); T or Mod = Tacky (3); Mod to Sev or V = Very tacky (4); Severe = VV = Very Very Tacky (5);
*comparative example.

As shown in Table 6, above, the filled caulk formulations of the inventive emulsion copolymers all have improved tack and all but the caulk of Example 5 have improved low temperature flexibility when compared to the same caulk formulations that have the same emulsion copolymer made by random copolymerization. The Example 5 emulsion copolymer comprises more than the most preferred proportion of copolymerized hard phase monomers and the MMA hard phase monomer gives a polymer having a Tg at the endpoint of the preferred hard comonomer Tg range.

TABLE 7

Exemplary Caulk Viscosities

| Example | Emulsion Copolymer (g) | $NH_3$ (g) | Thickener[1] | Viscosity (cP) | Solids (Wt. %) |
|---|---|---|---|---|---|
| 3 | 835.6 | 15.7 | 7.6 | 240-251K | 61.3 |
| 5 | 832.4 | 15.0 | 11.7 | 220-238K | 61.0 |
| *4 | 826.0 | 16.9 | 16.1 | 168-172K | 60.6 |
| *6 | 839.1 | 14.6 | 5.3 | 119-125K | 61.5 |
| *21 | 843.3 | 5.4 | 11.9 | 124-129K | 61.7 |

*comparative example.
[1]ACRYSOL ™ TT-615 (The Dow Chemical Company) a Hydrophobically modified Alkali Soluble Emulsion supplied as a unneutralized emulsion at 30% total solids.

The caulks and sealants, both inventive and comparative, have high Brookfield viscosities at room temperature and at a pH of 8-9. By using a buffer in polymerization and not neutralizing the emulsion copolymer, one can keep the viscosity of the emulsion copolymer low prior to formulating it into a caulk or sealant composition.

We claim:

1. An aqueous caulk or sealant composition that is substantially free of any plasticizer comprising (i) an aqueous emulsion copolymer having a broad measured glass transition temperature (broad measured Tg) by differential scanning calorimetry (DSC) such that either the onset or final temperature of the recorded temperature curve of a DSC glass transition of the copolymer is poorly defined such that no meaningful single measured glass transition temperature (Tg) can be taken, and instead only a range of measured Tgs can be recorded, the copolymer having soft phase and hard phase domains and two separate Tan Delta transition temperatures as measured by dynamic mechanical analysis (DMA), which is the copolymer of a soft monomer composition which is a soft monomer or soft monomer mixture, which soft monomer composition would when polymerized to form a polymer or copolymer made from the soft monomer mixture provide a polymer having a calculated Tg of −20° C. or less, and of a hard comonomer composition which is a hard comonomer or hard comonomer mixture, which hard comonomer composition would when polymerized to form a polymer or copolymer made from the hard monomer mixture provide a polymer having a calculated Tg of from 20° C. to 140° C., (ii) one or more filler in a filler to aqueous emulsion copolymer binder ratio of from 0:1 to 4:1 (iii) from 0.2 to 5 wt.% as solids, based on the total weight of the composition, of one or more thickener or rheology modifier and, (iv) water to adjust viscosity, wherein the caulk and sealant compositions have a solids content ranging from 50 to 80 wt.% and the compositions have a Brookfield viscosity (room temperature, 5 rpm, using a T-Bar type T-F spindle for compositions with viscosities above 1,000,000 cPs, and a T-Bar type T-E spindle for compositions with viscosities of from 3,000 and 1,000,000 cPs) of from 10,000 to 1,000,000 cPs.

2. The composition as claimed in claim 1, wherein the soft monomer composition would when polymerized provide a polymer having a calculated Tg of −30° C. or less.

3. The composition as claimed in claim 1, wherein at least one of the soft monomer composition and hard comonomer composition is acrylic.

4. The composition as claimed in claim 1, wherein the emulsion copolymer comprises, in copolymerized form, an ethylenically unsaturated acidic monomer, in the amount of from 0.1 to 5 wt.% based on the total weight of monomers used to make the emulsion copolymer.

5. The composition as claimed in claim 1, the thickener or rheology modifier is chosen from cellulosics, kaolin, polyacrylic acid salts, hydrophobic alkali soluble emulsion polymers, polyurethane thickeners, and mixtures thereof.

6. The composition as claimed in claim 1, comprising 0.5 wt.% or less of plasticizer, based on the total weight of the composition.

7. The composition as claimed in any one of claims 1 to 6, further comprising one or more organosilane adhesion promoter.

8. The composition as claimed in claim 1, wherein the (i) aqueous emulsion copolymer is formed by polymerizing by gradually adding from a flask into a polymerization vessel the soft monomer composition, and, after feeding at least 20 wt.% of such composition into the polymerization vessel, gradually adding into the flask a hard comonomer composition while continuing to gradually add, all flask contents into the polymerization vessel and polymerizing.

9. The composition as claimed in claim 8, wherein the (i) aqueous emulsion copolymer is formed by gradually adding from a flask into a polymerization vessel the soft monomer composition, and, after feeding from 50 to 75wt.% of the soft monomer composition into the vessel, gradually adding into the flask the hard comonomer composition.

* * * * *